United States Patent
Tomer

(10) Patent No.: US 9,301,116 B2
(45) Date of Patent: Mar. 29, 2016

(54) METHOD, APPARATUS, AND SYSTEM FOR DETECTING AN AUTOMOBILE CRASH AND TRANSMITTING AN EMERGENCY COMMUNICATION

(71) Applicant: RFT Stewardship, LP, Carson City, NV (US)

(72) Inventor: Rex Franklin Tomer, Bento, IL (US)

(73) Assignees: Amber Tomer, Benton, IL (US); Clint Tomer, Edwardsville, IL (US)

( * ) Notice: Subject to any disclaimer, the term of this patent is extended or adjusted under 35 U.S.C. 154(b) by 466 days.

(21) Appl. No.: 13/787,324

(22) Filed: Mar. 6, 2013

(65) Prior Publication Data

US 2013/0194087 A1    Aug. 1, 2013

Related U.S. Application Data

(63) Continuation-in-part of application No. 12/685,726, filed on Jan. 12, 2010, now Pat. No. 8,417,210.

(60) Provisional application No. 61/153,497, filed on Feb. 18, 2009.

(51) Int. Cl.
| | |
|---|---|
| *H04M 11/04* | (2006.01) |
| *H04W 4/22* | (2009.01) |
| *B60R 21/0136* | (2006.01) |
| *G08G 1/00* | (2006.01) |

(52) U.S. Cl.
CPC ............. *H04W 4/22* (2013.01); *B60R 21/0136* (2013.01); *G08G 1/205* (2013.01); *H04M 11/04* (2013.01)

(58) Field of Classification Search
USPC ............ 701/433, 533, 410; 455/404.1, 404.2, 455/456.1
See application file for complete search history.

(56) References Cited

U.S. PATENT DOCUMENTS

| | | | |
|---|---|---|---|
| 5,555,286 A | 9/1996 | Tendler | |
| 5,742,666 A | 4/1998 | Alpert | |
| 6,142,518 A * | 11/2000 | Butt et al. | 280/741 |
| 6,682,356 B2 * | 1/2004 | Erez et al. | 439/108 |
| 7,181,192 B2 | 2/2007 | Panasik et al. | |
| 7,289,786 B2 | 10/2007 | Krasner | |
| 7,479,889 B2 | 1/2009 | Kazdin et al. | |
| 7,508,298 B2 | 3/2009 | Pisz et al. | |
| 7,561,887 B2 | 7/2009 | Lockhart | |
| 7,574,195 B2 | 8/2009 | Krasner et al. | |
| 2005/0037730 A1 * | 2/2005 | Montague | 455/404.2 |
| 2007/0075919 A1 | 4/2007 | Breed | |
| 2008/0042409 A1 | 2/2008 | Breed | |
| 2008/0088462 A1 | 4/2008 | Breed | |
| 2008/0111666 A1 | 5/2008 | Plante et al. | |
| 2008/0147265 A1 | 6/2008 | Breed | |
| 2008/0270076 A1 | 10/2008 | Breed | |
| 2008/0272906 A1 | 11/2008 | Breed | |
| 2009/0076835 A1 | 3/2009 | Carter et al. | |
| 2013/0060489 A1 * | 3/2013 | Crossman et al. | 702/41 |

\* cited by examiner

*Primary Examiner* — Charles Appiah
*Assistant Examiner* — Randy Peaches
(74) *Attorney, Agent, or Firm* — Armstrong Teasdale LLP

(57) ABSTRACT

A device configured to be removably coupled to a vehicle is described. The device includes at least one sensor configured to detect an impact on the vehicle and a wireless communication device configured to transmit an impact indication signal upon said at least one sensor detecting an impact on the vehicle. Additionally, a method for automatically initiating a cellular phone emergency function in response to an impact on a vehicle is provided. Additionally, an emergency notification system for a vehicle is provided.

17 Claims, 13 Drawing Sheets

METHOD, APPARATUS, AND SYSTEM FOR DETECTING AN AUTOMOBILE CRASH AND TRANSMITTING AN EMERGENCY COMMUNICATION

CROSS REFERENCE TO RELATED APPLICATIONS

This application is a continuation-in-part of application Ser. No. 12/685,726, filed Jan. 12, 2010, which claims the benefit of U.S. Provisional Application No. 61/153,497, filed Feb. 18, 2009.

BACKGROUND OF THE INVENTION

The subject matter described herein relates generally to emergency cellular phone communication, and more specifically, to methods, apparatus, and systems for automatic initiation of an emergency cellular phone function.

Subscription services are presently available that embed a cellular communication device within a vehicle, for example, an automobile. In other words, these embedded cellular communication devices are part of the automobile. The cellular communication device may include a speaker and a microphone. The cellular communication device may also include global positioning capabilities, for example, a global positioning system (GPS). Through use of the GPS, the cellular communication device is able to communicate the location of the vehicle to an interested party. This is especially useful in a case of an emergency.

The microphone of the cellular communication device may be used to operate the cellular communication device through the use of voice commands. The cellular communication device may include an input, for example a button, that when pressed is configured to direct the cellular communication device to contact a centralized human operator who is able to assist the operator of the vehicle. Some cellular communication devices are coupled to sensors in the automobile and configured to automatically contact the centralized human operator in certain predefined circumstances. For example, upon deployment of an automobile's airbag(s), the cellular communication device may be configured to contact the centralized human operator. The centralized human operator can communicate with the operator of the vehicle using the speaker and the microphone and determine if the situation warrants contacting emergency services, such as police, fire, and/or ambulance services. Other cellular communication devices include an emergency contact input device, for example, a button, that when pressed, will automatically summons emergency services.

Typically, to enroll in a subscription service, a driver must own an automobile that includes the embedded cellular communication device, and also pay a recurring fee, for example, a monthly or yearly subscription fee. This subscription fee is dedicated solely to cellular communication using the automobile's cellular communication device and not, for example, to a home phone or personal cellular phone. A driver who is enrolled in a personal cellular phone contract has to also enroll in the separate, automotive cellular subscription service. Also, access to automotive cellular subscription services may be limited due to exclusive contracts between providers of subscription services and specific automobile manufacturers. For example, the OnStar® subscription service (OnStar is a registered trademark of OnStar, LLC) is exclusively available in automobiles manufactured by or for General Motors Corporation. For some automobiles, there are no automotive cellular subscription services available. Furthermore, typically, automotive cellular subscription services may also be limited to locations where the subscription service provides cellular coverage. Moreover, automotive cellular communication devices, since embedded within the vehicle, require that the vehicle's battery be connected to the cellular communication device and provide enough electricity to power the device.

BRIEF DESCRIPTION OF THE INVENTION

In one aspect, a device configured to be removably coupled to a vehicle is provided. The device includes at least one sensor configured to detect an impact on the vehicle and a wireless communication device configured to transmit an impact indication signal upon said at least one sensor detecting an impact on the vehicle.

In another aspect, a method for automatically initiating a cellular phone emergency function in response to an impact on a vehicle is provided. The method includes coupling a device to the vehicle. The device is configured to be removably coupled to the vehicle. The device includes at least one sensor configured to detect an impact on the vehicle and at least one of wireless communication device and a conductor coupled to the cellular phone. The method includes receiving, from the at least one sensor, an emergency indication signal at the wireless communication device, upon the at least one sensor detecting an impact on the vehicle. The method additionally includes transmitting an impact indication signal from the device to the cellular phone and initiating at least one preprogrammed cellular phone emergency function in response to the impact indication signal.

In yet another aspect, an emergency notification system for a vehicle is provided. The system includes a device configured to be removably coupled to the vehicle. The device includes at least one sensor configured to detect an impact on the vehicle and a wireless communication device configured to transmit an impact indication signal upon the at least one sensor detecting an impact on the vehicle. The system additionally includes a cellular phone configured to initiate at least one preprogrammed cellular phone emergency function in response to the impact indication signal received from said wireless communication device.

DETAILED DESCRIPTION OF THE INVENTION

The methods, apparatus, and systems described herein provide automatic initiation of a cellular phone emergency function upon deployment of a vehicle's airbag. Technical effects of the methods, apparatus, and systems described herein include at least one of: (a) receiving, from a vehicle sensor, an airbag deployment signal at an emergency signal assembly; and (b) transmitting the airbag deployment signal from the emergency signal assembly to a cellular phone. Technical effects of the methods, apparatus, and systems described herein may also include at least one of: (a) receiving, at a cellular phone, an airbag deployment signal from an emergency signal assembly; and (b) initiating at least one preprogrammed cellular phone emergency function in response to the airbag deployment signal.

Figure 1:
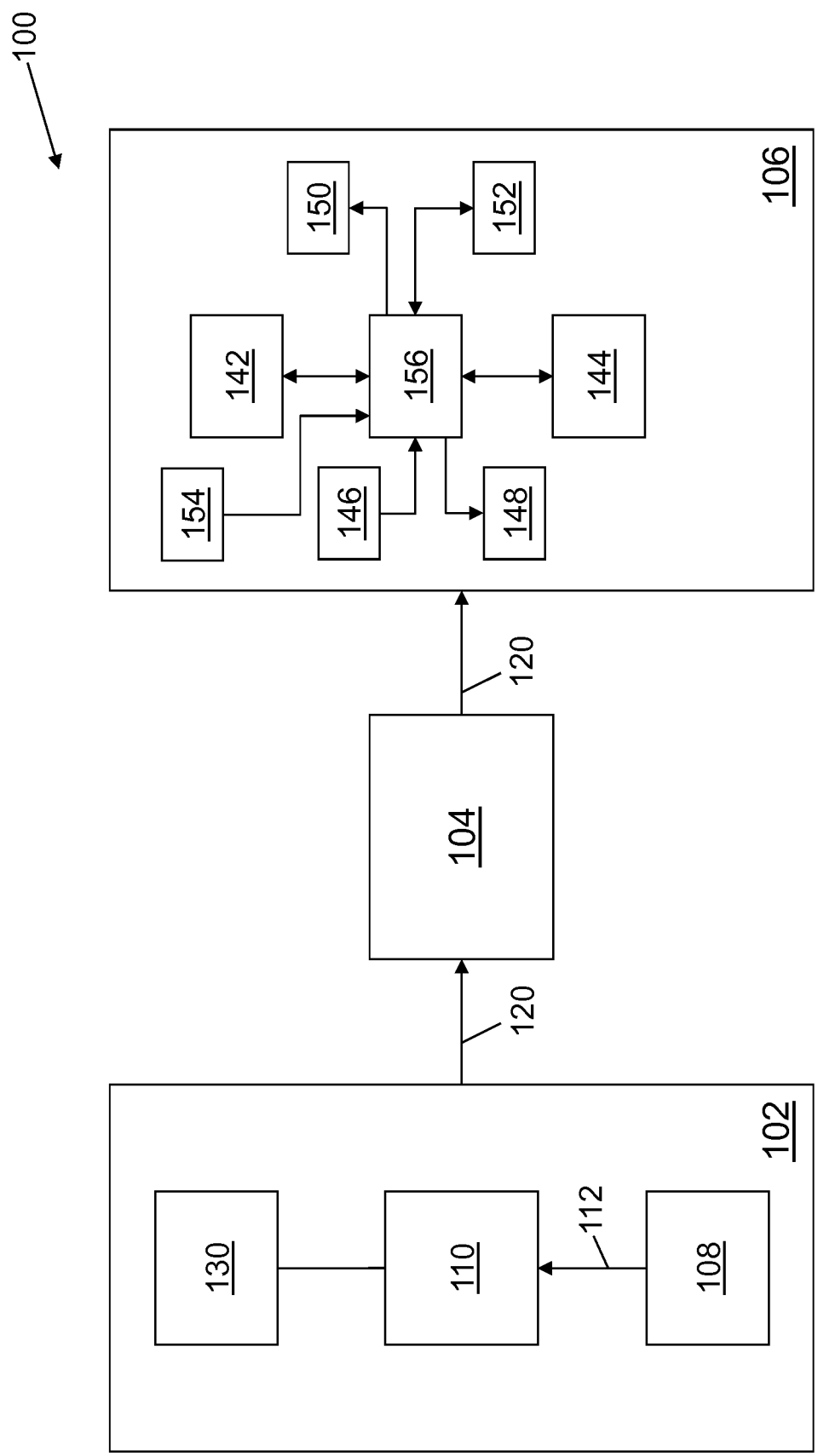
FIG. 1 is a block diagram illustrating an exemplary embodiment of an emergency notification system.

FIG. 1 is a block diagram illustrating an exemplary emergency notification system 100. System 100 is configured to be positioned within a vehicle, for example, but not limited to, an automobile, a watercraft, an aircraft, a locomotive, and or any other form of transportation that would allow system 100 to function as described herein. In the exemplary embodiment, system 100 includes an airbag deployment system 102, an emergency signal assembly 104, and a cellular phone 106. Airbag deployment system 102, emergency signal assembly 104, and cellular phone 106 may be physically coupled by a conductor, for example, a wire, or may be communicatively coupled using wireless technology, for example, but not limited to, Bluetooth® technology (Bluetooth is a trademark of Bluetooth SIG, Inc. of Bellevue, Wash., U.S.A.). System 100 facilitates automatic initiation of at least one preprogrammed emergency function of cellular phone 106.

In the exemplary embodiment, airbag deployment system 102 includes at least one sensor 108 and at least one airbag 110. Although described herein as including a single airbag 110, system 102 may include multiple airbags 110. System 100 is configured to facilitate automatic initiation of at least one preprogrammed emergency function of cellular phone 106 upon deployment of one or more of airbags 110. Sensor 108 measures conditions that may indicate that the vehicle is involved in a situation that would warrant contacting a provider of emergency services, for example, a vehicle impact, collision, or other type of accident that causes a rapid deceleration of the vehicle. Sensor 108 may include an accelerometer configured to measure a deceleration of the vehicle and/or an orientation of the vehicle. If the deceleration indicates a rapid deceleration, sensor 108 generates an emergency indication signal 112 and sends emergency indication signal 112 to airbag 110, which deploys upon receipt of emergency indication signal 112. Sensor 108 may also measure changes in environmental conditions, for example, but not limited to changes in air pressure and changes in humidity level. Such environmental conditions may provide an indication that the vehicle is involved in an emergency situation. Airbag 110 is a passive vehicle safety device that evenly slows the forward motion of a vehicle passenger during a vehicle crash. Airbag 110 is included within the vehicle to reduce injuries to vehicle occupants.

Figure 2:
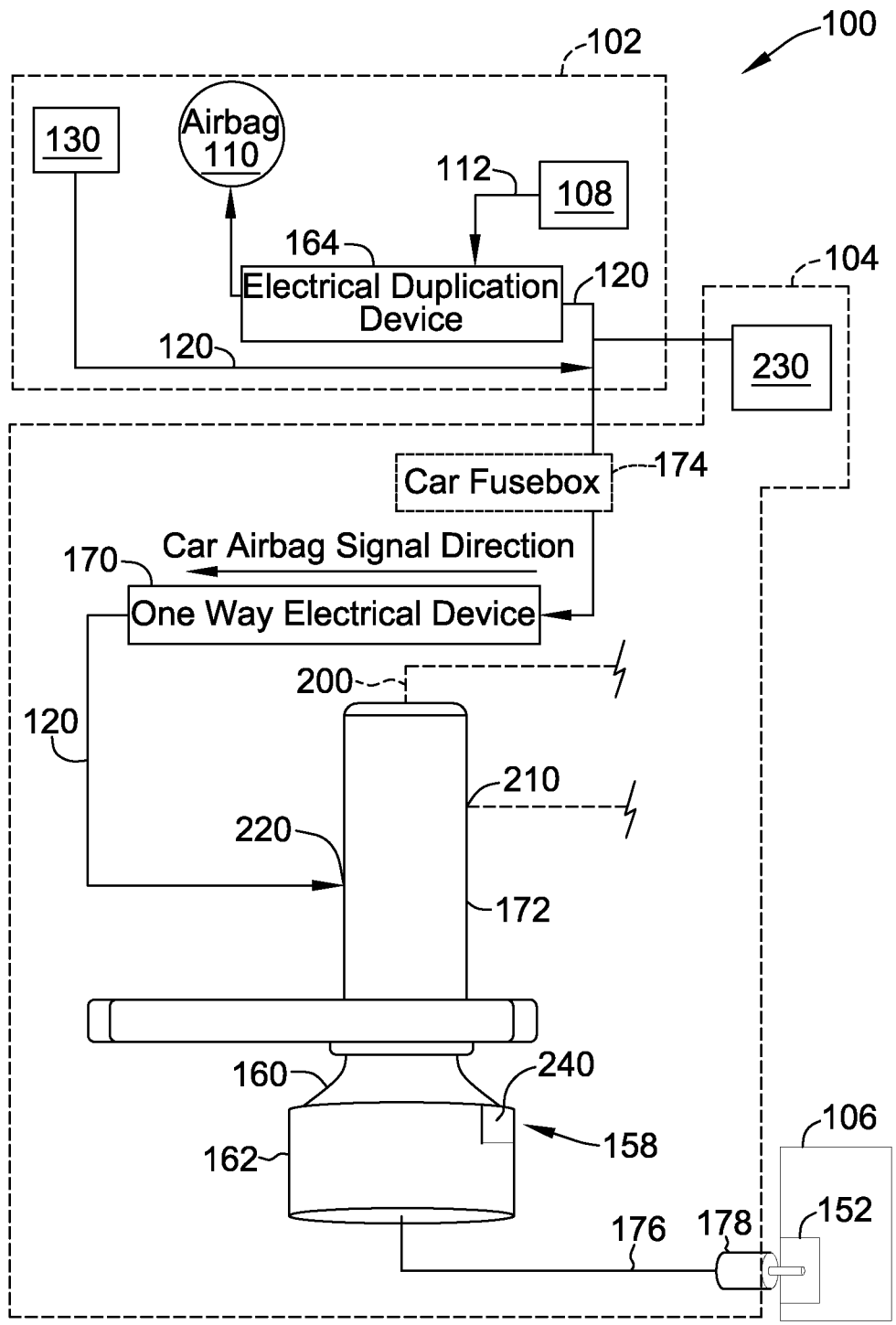
FIG. 2 is block diagram illustrating an exemplary embodiment of the emergency notification system shown in FIG. 1, including an emergency communication apparatus connected to a vehicle accessory power receptacle.

In the exemplary embodiment, emergency signal assembly 104 includes an emergency communication apparatus (shown in FIG. 2) and a vehicle accessory power receptacle (shown in FIG. 2). The emergency signal assembly 104 receives an airbag deployment signal 120 from airbag deployment system 102. Airbag deployment signal 120 is at least one of a signal that corresponds to a deployed airbag and a signal sent to the airbag to deploy the airbag (e.g., emergency indication signal 112). As described above, sensor 108 generates emergency indication signal 112, which may also be transmitted to emergency signal assembly 104 as airbag deployment signal 120. Additionally, or alternatively, an airbag deployment sensor 130 may generate airbag deployment signal 120 once airbag deployment sensor 130 detects that airbag 110 has deployed. Furthermore, airbag deployment signal 120 may include any other suitable signal generated to initiate deployment of airbag 110 and/or to indicate that airbag 110 has been deployed.

In the exemplary embodiment, emergency signal assembly 104 transmits airbag deployment signal 120 to cellular phone 106. Cellular phone 106 comprises a personal cellular phone, a smart phone, and/or any other cellular communication device that allows system 100 to function as described herein. Typically, cellular phone 106 includes a memory device 142, a transceiver 144, an input device 146, an output device 148, a wireless communication device 150, a power/data port 152, and a global positioning system (GPS) device 154, all coupled to a cellular phone processor 156. The term processor, as used herein, refers to central processing units, microprocessors, microcontrollers, reduced instruction set circuits (RISC), application specific integrated circuits (ASIC), logic circuits, and any other circuit or processor capable of executing the functions described herein. Input device 146 may include, but is not limited to, a microphone, a keypad, and a digital camera. Output device 148 may include, but is not limited to, a speaker and a display screen. Wireless communication device 150 may include, but is not limited to, a radio frequency identification (RFID) device, a Bluetooth® compatible device, a near-field communication device, or any other suitable wireless communication device that allows system 100 to function as described herein. Typically, power/data port 152 is manufacturer-specific, and is operable to connect a battery charger to cellular phone 106 and also to transmit/receive data and/or phone control signals from an external source. In the exemplary embodiment, power/data port 152 includes a dedicated conductor that is part of a circuit that includes airbag deployment system 102, emergency signal assembly 104, and cellular phone 106. The dedicated conductor is configured to receive airbag deployment signal 120 and to activate the at least one preprogrammed emergency function of cellular phone 106.

In the exemplary embodiment, cellular phone 106 receives airbag deployment signal 120 and initiates at least one emergency function of cellular phone 106. More specifically, cellular phone 106 receives airbag deployment signal 120 at at least one of wireless communication device 150 and power/data port 152. Emergency functions are preprogrammed functions stored, for example, in memory device 142. Emergency functions may include, but are not limited to, initiating a phone call to an emergency service provider, initiating a phone call to a stored emergency contact, recording audio using the cellular phone, and/or recording images using the cellular phone. Emergency functions may also include sending a location, for example, GPS coordinates from GPS device 154, to the emergency service provider and/or the emergency contact. The emergency service provider may include a fire department, a police department, and/or a hospital, and is typically contacted by dialing 9-1-1. The emergency contact may include a third party whose phone number is stored in a predefined emergency contact location within memory device 142.

In the exemplary embodiment, recording audio and/or recording images functions as a type of "black box." For example, after an aircraft crash, authorities try to retrieve the black box from the aircraft to give them the last information of what was happening to the aircraft during the last minutes of flight. Many automobiles also include a black box that can provide authorities with data corresponding to events prior to an accident. Using system 100, cellular phone 106 may additionally record images and sounds of what occurs directly after an accident. Valuable information may be provided to the authorities to help in the process of finding out what happened and who was responsible. For example, upon receipt of airbag deployment signal 120, cellular phone 106 discontinues any processes currently being performed, places a call to 9-1-1, and records sounds, pictures, and/or video. More specifically, cellular phone 106 may take pictures periodically, for example, every two to five seconds, or record video. The audio may be recorded for a predefined time period after receipt of airbag deployment signal 120. For example, audio may be recorded for approximately one to two minutes, or until a connection with a 9-1-1 operator is accomplished, because 9-1-1 calls are recorded. After cellular phone 106 is connected to a 9-1-1 operator, the operator will be able to pinpoint the location of cellular phone 106 using GPS device 154 in cellular phone 106. Furthermore, cellular phone 106 may also call anyone on an emergency call list stored in memory device 142 to notify them of the accident and tell them the location of the vehicle.

Figure 3:
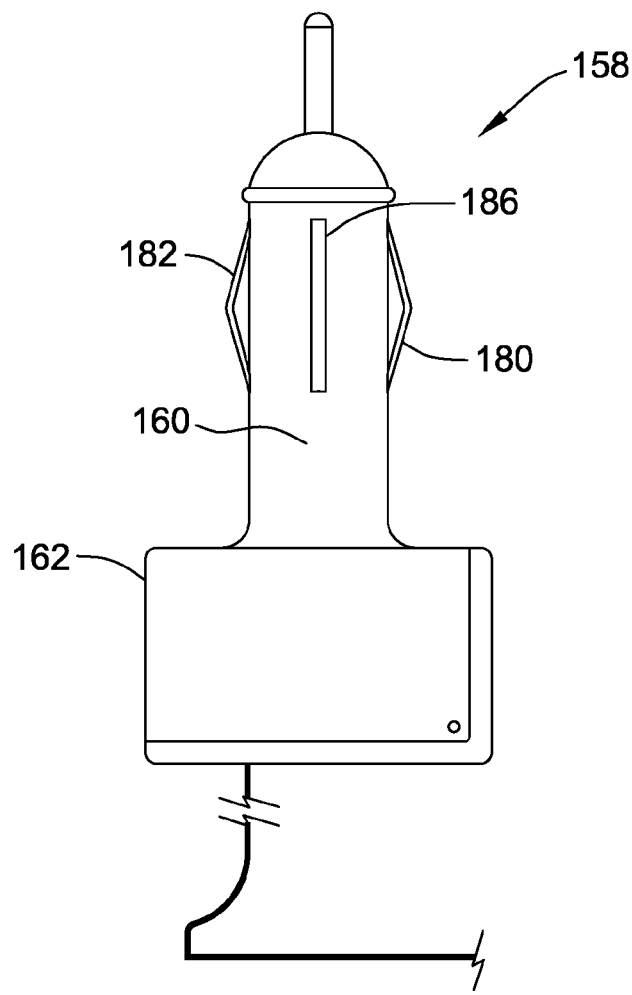
FIG. 3 is a side view of the emergency communication apparatus shown in FIG. 2.
Figure 4:
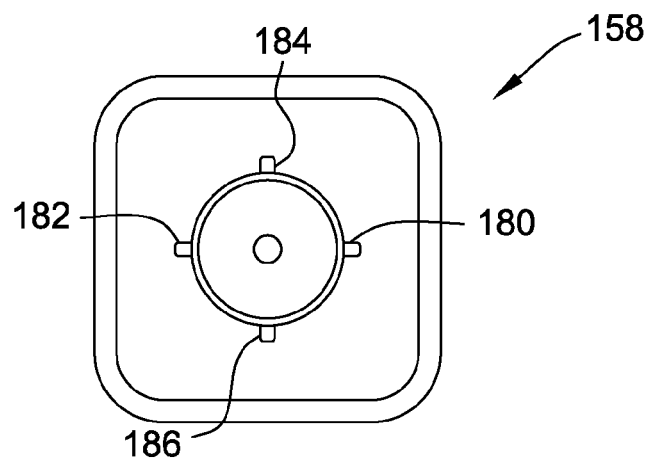
FIG. 4 is a top view of the emergency communication apparatus shown in FIG. 2.

FIG. 2 is a block diagram illustrating an exemplary embodiment of emergency notification system 100 shown in FIG. 1. FIG. 3 is a side view of an exemplary embodiment of a cellular phone emergency communication apparatus 158, also referred to herein as an emergency communication accessory, which may be included within system 100. FIG. 4 is a top view of the emergency communication apparatus 158 shown in FIG. 3. In the exemplary embodiment, emergency communication apparatus 158 includes a body 160 and a handle 162. In the exemplary embodiment, airbag deployment system 102 includes airbag 110, sensor 108, and an electrical duplication device 164. Electrical duplication device 164 receives emergency indication signal 112 from sensor 108 and transmits emergency indication signal 112 to both airbag 110 and emergency signal assembly 104. As described above, emergency indication signal 112 is an example of airbag deployment signal 120.

In the exemplary embodiment, emergency signal assembly 104 includes a one-way electrical device 170 and a vehicle accessory power receptacle 172. Receptacle 172 is configured to receive emergency communication apparatus 158. More specifically, receptacle 172 is configured to receive body 160 of emergency communication apparatus 158. In some embodiments, receptacle 172 is coupled to airbag deployment system 102 through a vehicle fuse box 174 and through one-way electrical device 170. Furthermore, in the exemplary embodiment, receptacle 172 is a vehicle accessory power source which may be also used as, or commonly referred to as a cigarette lighter receptacle. Receptacle 172 may also include any other type of auxiliary plug-in included within a vehicle. Typically, receptacle 172 provides access to twelve volt direct-current power (12V DC), for example, for powering electric devices such as a GPS device, a laptop computer, a spotlight, and/or cellular phone 106. System 100 is shown as including one receptacle 172, however, system 100, may include any number of receptacles. For example, if a vehicle includes multiple receptacles 172, each of the receptacles is included within system 100. More specifically, in examples where system 100 includes multiple receptacles 172, each receptacle 172 is coupled to airbag deployment system 102, to ensure that airbag deployment signal 120 is received by emergency communication apparatus 158, independent of which receptacle 172 emergency communication apparatus 158 is coupled to.

In the exemplary embodiment, emergency communication apparatus 158 is configured to couple cellular phone 106 to receptacle 172 of emergency signal assembly 104. For example, emergency communication apparatus 158 may include a conductor 176 and a plug 178. Conductor 176 may include a wiring harness, which includes a plurality of individual conductors insulated from one another, coupled to plug 178. Plug 178 may be configured to mate with power/data port 152 of cellular phone 106. For example, plug 178 may include a flat-type plug, a straight-type plug, or any suitable type of plug and/or plug-in "tip" provided by a manufacturer of cellular phone 106. Furthermore, handle 162 may be any suitable shape, for example, but not limited to, round, triangular, rectangular, square, or "T" shaped, that allows emergency communication apparatus 158 to function as described herein. In contrast to a typical cellular phone charging accessory, emergency communication apparatus 158 includes two negative ground posts 180 and 182 and two signal receiving posts 184 and 186. Negative ground posts 180 and 182 facilitate charging a battery of cellular phone 106. Signal receiving posts 184 and 186 receive, via corresponding conductors positioned within receptacle 172, airbag deployment signal 120 from airbag deployment system 102. Vehicle fuse box 174 facilitates reducing accidental sparks or overheating when a connection is made between receptacle 172 and emergency communication apparatus 158.

In the exemplary embodiment, airbag deployment signal 120 is received on signal receiving posts 184 and 186 and transmitted to cellular phone 106 through conductor 176 and plug 178. For example, conductor 176 may include a dedicated conductor coupled directly to a dedicated location on plug 178. The dedicated conductor transmits airbag deployment signal 120 to cellular phone 106. The dedicated location on plug 178 connects with a dedicated receptacle inside cellular phone 106 once its connected together to complete a circuit for airbag deployment signal 120 to be received from airbag deployment system 102 and to initiate the at least one preprogrammed emergency function of cellular phone 106.

As described above, emergency communication apparatus 158 includes signal receiving posts 184 and 186 that receive airbag deployment signal 120 via corresponding conductors positioned within receptacle 172. In the exemplary embodiment, in addition to a positive feed conductor 200 and a negative feed conductor 210, which are included in typical cigarette lighter and/or accessory power receptacles, receptacle 172 also includes an airbag signal feed conductor 220. When emergency communication apparatus 158 is positioned within receptacle 172, airbag signal feed conductor 220 is electrically coupled to at least one of signal receiving posts 184 and 186. In the exemplary embodiment, one-way electrical device 170 facilitates preventing an accidental airbag deployment should a device having a positive charge be plugged into receptacle 172 and/or plug 178 of emergency communication apparatus 158. In some embodiments, airbag deployment signal 120 passes through vehicle fuse box 174. For example, when airbag deployment signal 120 is received at signal receiving post 184 and/or 186, positive feed conductor 200 and negative feed conductor 210 within receptacle 172, and/or negative ground posts 180 and 182 within emergency communication apparatus 158, may connect, causing a fuse within vehicle fuse box 174 to blow, which typically causes illumination of a "check airbag" light on a vehicle dashboard. However, the blown fuse and illuminated "check airbag" light occur after airbag deployment signal 120 has been delivered from the connection on signal receiving posts 184 and 186 to cellular phone 106, which allows initiation of the preprogrammed emergency function of cellular phone 106.

As described above, there are various types of sensors 108 that may be included within a vehicle. The various types of sensors 108 generate different types of emergency indication signals 112. In the exemplary embodiment, electrical duplication device 164 is configured to split and/or duplicate a signal generated by sensor 108. In an exemplary embodiment, electrical duplication device 164 delivers emergency indication signal 112 to airbag 110 and to emergency signal assembly 104. In an alternative embodiment, electrical duplication device 164 delivers emergency indication signal 112 to airbag 110, generates airbag deployment signal 120, and delivers airbag deployment signal 120 to emergency signal assembly 104. In other words, electrical duplication device 164 may be configured to generate airbag deployment signal 120 from emergency indication signal 112 and/or generate airbag deployment signal 120 upon receipt of emergency indication signal 112. Airbag deployment signal 120 may be substantially identical to emergency indication signal 112 or emergency indication signal 112 may be modified and/or converted to a signal understood by emergency signal assembly 104.

In the exemplary embodiment, emergency signal assembly 104 also includes a wireless communication device 230. Wireless communication device 230 is configured to communicate with wireless communication device 150 of cellular phone 106. System 100 may include wireless communication device 230 and receptacle 172, wireless communication device 230 without receptacle 172, or receptacle 172 without wireless communication device 230. In at least some examples, wireless communication device 230 is provided as a back-up to receptacle 172. If cellular phone 106 is not coupled to emergency communication apparatus 158, and therefore not coupled to receptacle 172, wireless communication device 230 allows system 100 to function as described herein. For example, if cellular phone 106 is not coupled to receptacle 172, and emergency communication apparatus 158 is not coupled to receptacle 172, cellular phone 106 may still receive airbag deployment signal 120 via communication with wireless communication device 230. Wireless communication device 230 may include, but is not limited to, a radio frequency identification (RFID) device, a Bluetooth® compatible device, a near-field communication device, or any other suitable wireless communication device that allows system 100 to function as described herein.

As described above, airbag deployment signal 120 may be sent to receptacle 172 and/or to wireless communication device 230. Wireless communication device 230 may be pre-installed in some vehicles or may be added as an after-market accessory. In the event that cellular phone 106 is not plugged into emergency communication apparatus 158 and receptacle 172, and airbag 110 is deployed, when connected to the wireless communication device 230, the preprogrammed emergency function of cellular phone 106 may still be activated because cellular phone 106, and more specifically, wireless communication device 150 of cellular phone 106, receives the airbag deployment signal 120 from wireless communication device 230.

In at least some embodiments, handle 162 of emergency communication apparatus 158 may also include a wireless communication device 240. Wireless communication device 240 provides a wireless communication connection between emergency communication apparatus 158 and cellular phone 106. In the exemplary embodiment, wireless communication device 240 is activated after it receives airbag deployment signal 120 from at least one of signal receiving posts 184 and 186. Wireless communication device 240 wirelessly transmits airbag deployment signal 120 until signal 120 is received by cellular phone 106, which activates the preprogrammed emergency function of cellular phone 106. Wireless communication device 240 provides a back-up when emergency communication apparatus 158 is positioned within receptacle 172, but cellular phone 106 is not plugged into emergency communication apparatus 158. For example, wireless communication devices 230 and 240 are configured to communicate with wireless communication device 150 of cellular phone 106. Wireless communication device 150 recognizes airbag deployment signal 120 and signals cellular phone processor 156 to activate the at least one preprogrammed emergency function of cellular phone 106. The wireless signal generated by wireless communication device 240 and/or wireless communication device 230 may transmit over a range from, for example, 10-500 feet so that any cellular phones within that range would initiate an emergency function and authorities would know who was a witness to the accident and/or emergency.

Figure 5:
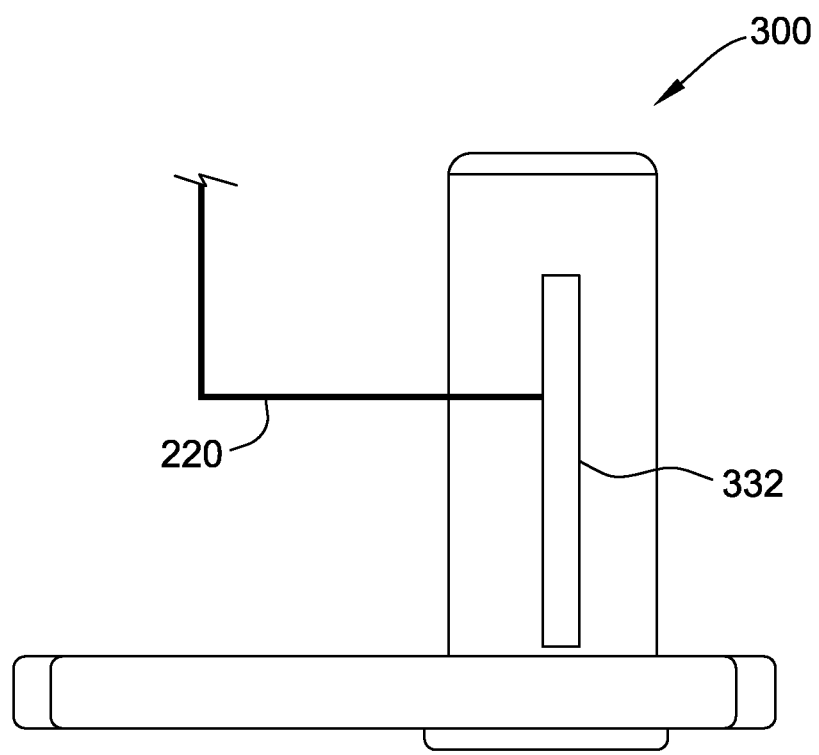
FIG. 5 is a side view of a first alternative embodiment of the vehicle accessory power receptacle shown in FIG. 2.
Figure 6:
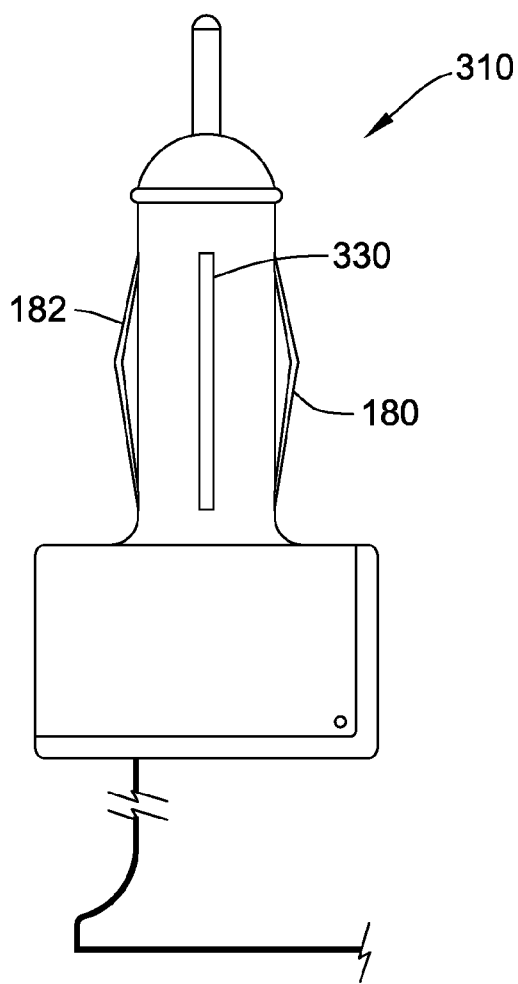
FIG. 6 is a side view of a first alternative embodiment of the emergency communication apparatus shown in FIG. 3.
Figure 7:
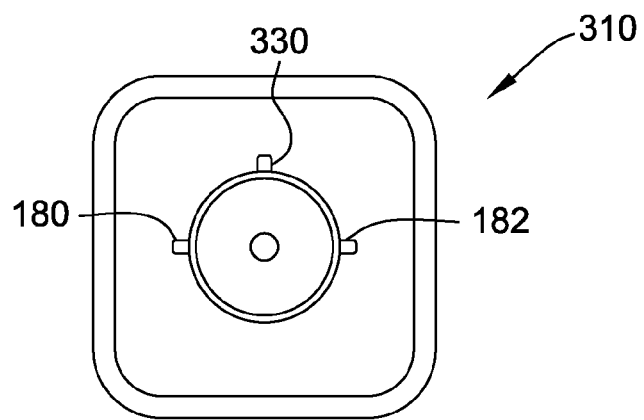
FIG. 7 is a top view of the emergency communication apparatus shown in FIG. 6.

FIG. 5 is a side view of a first alternative embodiment 300 of the vehicle receptacle 172 shown in FIG. 2. FIG. 6 is a side view of a first alternative embodiment 310 of the emergency communication apparatus 158 shown in FIG. 3. FIG. 7 is a top view of emergency communication apparatus 310 shown in FIG. 6. Emergency communication apparatus 310 includes a tab 330, for example, a tab extending radially outward from a surface of emergency communication apparatus 310, or raised from the surface of emergency communication apparatus 310 in any suitable manner that allows system 100 to function as described herein. Receptacle 300 includes a corresponding slot 332 configured to receive tab 330. Airbag signal feed conductor 220 is coupled to, or positioned within, slot 332. Tab 330 receives airbag deployment signal 120 from airbag deployment system 102 and/or from vehicle fuse box 174. Tab 330 and corresponding slot 332 ensure proper alignment of emergency communication apparatus 310 within receptacle 300. Receptacle 300 accepts regular vehicle accessories in the same manner as typical vehicle receptacles accept vehicle accessories. However, there is only one orientation in which emergency communication apparatus 310 can plug into receptacle 300 because of tab 330.

Figure 8:
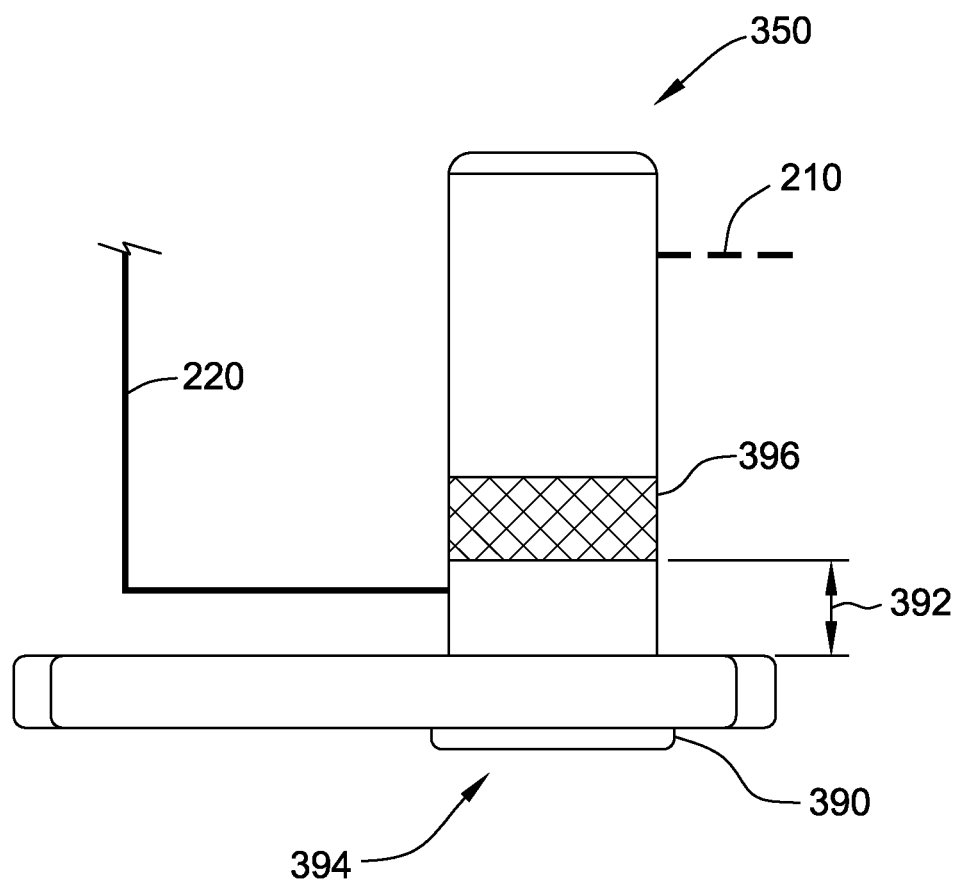
FIG. 8 is a side view of a second alternative embodiment of the vehicle accessory power receptacle shown in FIG. 2.
Figure 9:
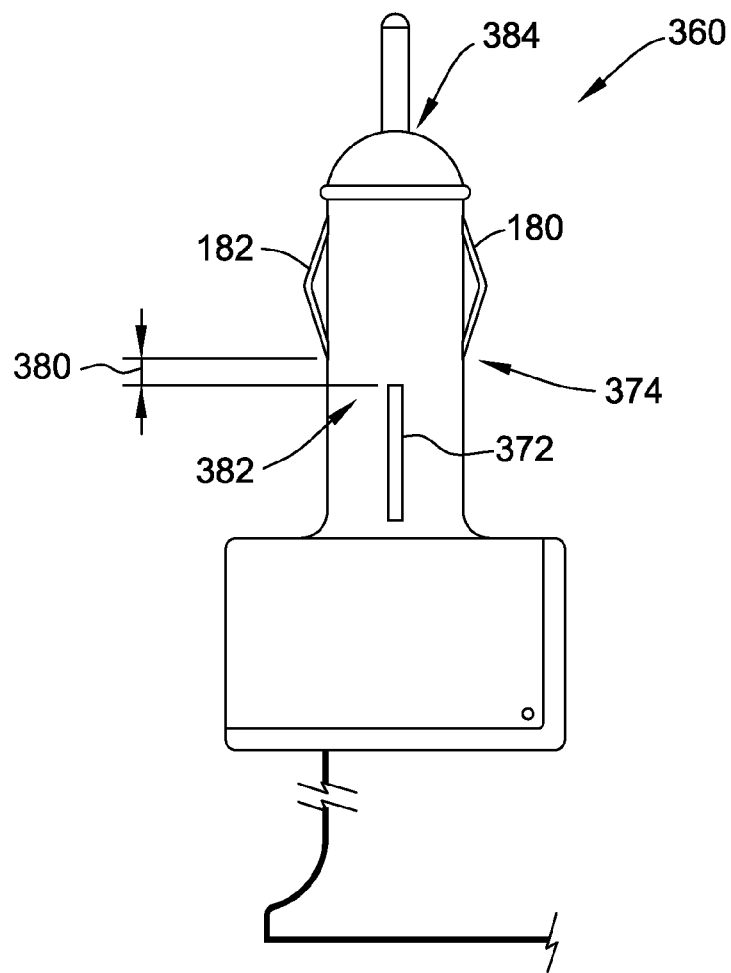
FIG. 9 is a side view of a second alternative embodiment of the emergency communication apparatus shown in FIG. 3.
Figure 10:
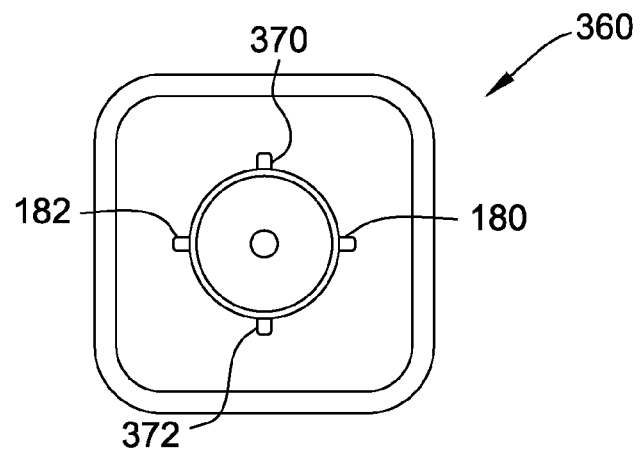
FIG. 10 is a top view of the emergency communication apparatus shown in FIG. 9.

FIG. 8 is a side view of a second alternative embodiment 350 of the vehicle receptacle 172 shown in FIG. 2. FIG. 9 is a side view of a second alternative embodiment 360 of the emergency communication apparatus 158 shown in FIG. 3. FIG. 10 is a top view of emergency communication apparatus 360 shown in FIG. 9. In the exemplary embodiment, emergency communication apparatus 360 includes negative ground posts 180 and 182 and also includes signal receiving posts 370 and 372. In some examples, a first end 374 of negative ground posts 180 and 182 is positioned a distance 380 from a first end 382 of signal receiving posts 370 and 372. For example, in at least one example, distance 380 is within a range of about ⅛-⅜ of an inch. As described above, negative ground posts 180 and 182 are substantially similar to the negative ground wire posts included in any cellular phone car charger accessory. However, negative ground posts 180 and 182 may be positioned closer to a tip 384 of apparatus 360 than in a typical cellular phone car charger accessory.

In the exemplary embodiment, signal receiving posts 370 and 372 are configured to receive airbag deployment signal 120. Receptacle 350 includes a conducting lip 390 coupled to airbag signal feed conductor 220. Emergency communication apparatus 360 and receptacle 350 are configured such that signal receiving posts 370 and 372 are electrically coupled to conducting lip 390 when emergency communication apparatus 360 is positioned within receptacle 350. Alternatively, contact between signal receiving posts 370 and 372 and airbag signal feed conductor 220 may be made in a first portion 392 of receptacle 350. First portion 392 of receptacle 350 may be electrically coupled, or formed from the same conductor, as conducting lip 390. In at least one example, first portion 392 of receptacle 350 includes conducting lip 390 and approximately ⅛-⅝ of an inch of receptacle 350, measured from an open end 394 of receptacle 350. First portion 392 is electrically insulated from the rest of receptacle 350 by an insulating band 396 to facilitate preventing contact between signal receiving posts 370 and 372 and negative feed conductor 210 of receptacle 350. Signal receiving posts 370 and 372 may be angled at a 45° angle from a handle side to a body side of apparatus 360, may be a "teepee" type post, and/or may be any other suitable type of post that allows apparatus 360 to function as described herein. A reason for the 45° angle or the "teepee" shape is to prevent signal receiving posts 370 and 372 from making any accidental contact with the negative part of receptacle 350. Insulating band 396 also facilitates maintaining separation between signal receiving posts 370 and 372 and the negatively charged part of receptacle 350.

Figure 11:
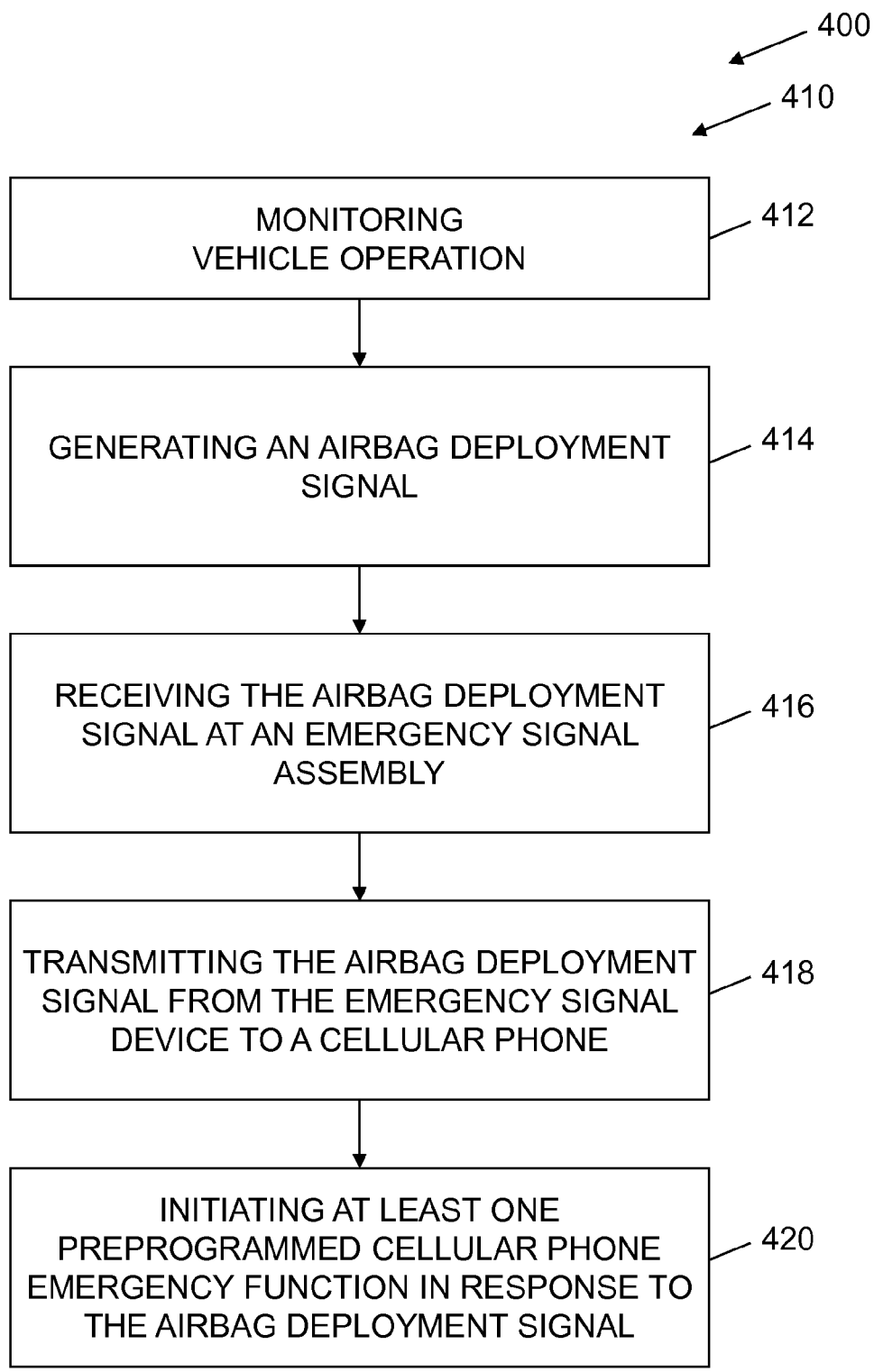
FIG. 11 is a flow chart illustrating an exemplary method for automatically initiating a cellular phone emergency function in response to an airbag deployment.

FIG. 11 is a flow chart 400 an exemplary method 410 for automatically initiating a cellular phone emergency function in response to an airbag deployment within a vehicle. In the exemplary embodiment, method 410 includes monitoring 412 vehicle operation and generating 414 an airbag deployment signal, for example, airbag deployment signal 120 (shown in FIG. 1), upon a measured indication of an occurrence of a predefined event that warrants performance of emergency functions. For example, airbag deployment signal 120 may be generated 414 upon a measured indication of at least one of a predefined impact to the vehicle and/or a measured indication that an airbag has deployed or will be deployed. In the exemplary embodiment, an airbag deployment system, for example, airbag deployment system 102 (shown in FIG. 1) may include at least one sensor, for example, sensor 108 (shown in FIG. 1) and airbag sensor 130 (shown in FIG. 1) that generate airbag deployment signal 120 when an emergency is detected and/or when an airbag, for example, airbag 110 (shown in FIG. 1) is deployed. In the exemplary embodiment, electrical duplication device 164 delivers emergency indication signal 112 (shown in FIG. 1) to airbag 110 and to emergency signal assembly 104. In an alternative embodiment, electrical duplication device 164 delivers emergency indication signal 112 to airbag 110, generates airbag deployment signal 120, and delivers airbag deployment signal 120 to emergency signal assembly 104.

Method 410 also includes receiving 416 airbag deployment signal 120 at an emergency signal assembly, for example, emergency signal assembly 104 (shown in FIG. 2). An automobile sensor, for example, crash sensor 108 and/or airbag sensor 130, generates airbag deployment signal 120 and transmits airbag deployment signal 120 to emergency signal assembly 104. In the exemplary embodiment, emergency signal assembly 104 includes an automotive accessory, for example, emergency communication apparatus 158 (shown in FIG. 2), configured to communicatively couple a cellular phone, for example, cellular phone 106 (shown in FIG. 2), to airbag deployment system 102. Method 410 also includes transmitting 418 airbag deployment signal 120 from emergency signal assembly 104 to cellular phone 106. Transmitting 418 airbag deployment signal 120 from emergency signal assembly 104 to cellular phone 106 may include transmitting airbag deployment signal 120 through a conductor, for example, conductor 176 (shown in FIG. 2). Transmitting 418 airbag deployment signal 120 from emergency signal assembly 104 to cellular phone 106 may include transmitting airbag deployment signal 120 using a wireless communication device, for example, wireless communication device 230 (shown in FIG. 2) and/or wireless communication device 240 (shown in FIG. 2).

In the exemplary embodiment, method 410 also includes initiating 420 at least one preprogrammed cellular phone emergency function in response to airbag deployment signal 120. Initiating 420 at least one preprogrammed cellular phone emergency function may include automatically initiating a phone call to an emergency service provider by accessing a phone number associated with the emergency service provider stored in cellular phone 106. Initiating 420 at least one preprogrammed cellular phone emergency function may also include automatically initiating a phone call to an emergency contact by accessing a phone number associated with the emergency contact stored in cellular phone 106. The at least one preprogrammed cellular phone emergency function may also include providing a location of cellular phone 106 to at least one of the emergency service provider and the emergency contact. Initiating 420 at least one preprogrammed cellular phone emergency function may also include recording audio using cellular phone 106, recording video using cellular phone 106, and/or capturing still images using cellular phone 106. Recording audio and/or video, and capturing still images, documents what is occurring in the minutes after an accident. As described above, initiating 420 at least one preprogrammed cellular phone emergency function in response to airbag deployment signal 120 facilitates automatic activation of emergency requests and/or accident documentation, potentially at times when occupants of a vehicle are not able to perform such activities.

Figure 12:
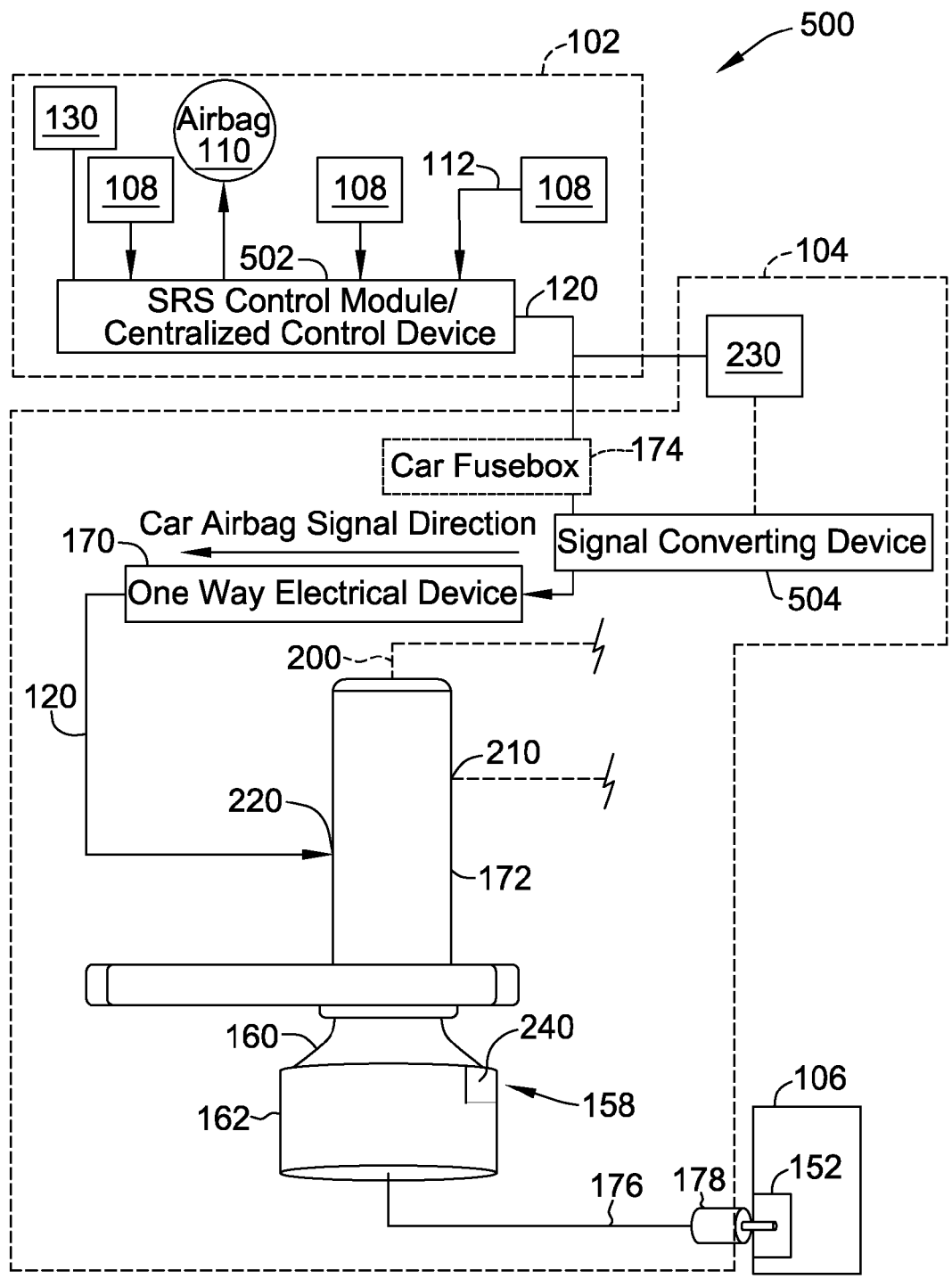
FIG. 12 is a block diagram illustrating an alternative embodiment of the emergency notification system shown in FIG. 2.

FIG. 12 is a block diagram illustrating an alternative embodiment 500 of the emergency notification system 100 shown in FIG. 2. System 500 is substantially similar to system 100, except system 500 includes a centralized control device 502 (e.g., a supplemental restraint system (SRS) control module), rather than including electrical duplication device 164. As such, components shown in FIG. 12 are labeled with the same reference numbers used in FIG. 2 and only the differences will be described.

In the exemplary embodiment, the vehicle employs a plurality of sensors 108, each of which may transmit emergency indication signals 112 to centralized control device 502. Centralized control device 502 transmits an impact indication signal 120 (i.e., the "airbag deployment signal" discussed above; also referred to as "electronic deployment inflation signal") to various devices in the vehicle, including airbag 110 and/or emergency signal assembly 104. In some embodiments, a signal converting device 504 is coupled to centralized control device 502 to convert impact indication signal 120 to a signal that is recognizable by cellular phone 106 and/or a Bluetooth system. Signal converting device 504 may either be integrated as part of centralized control device 502 or a standalone device positioned in-line with impact indication signal 120.

Figure 13:
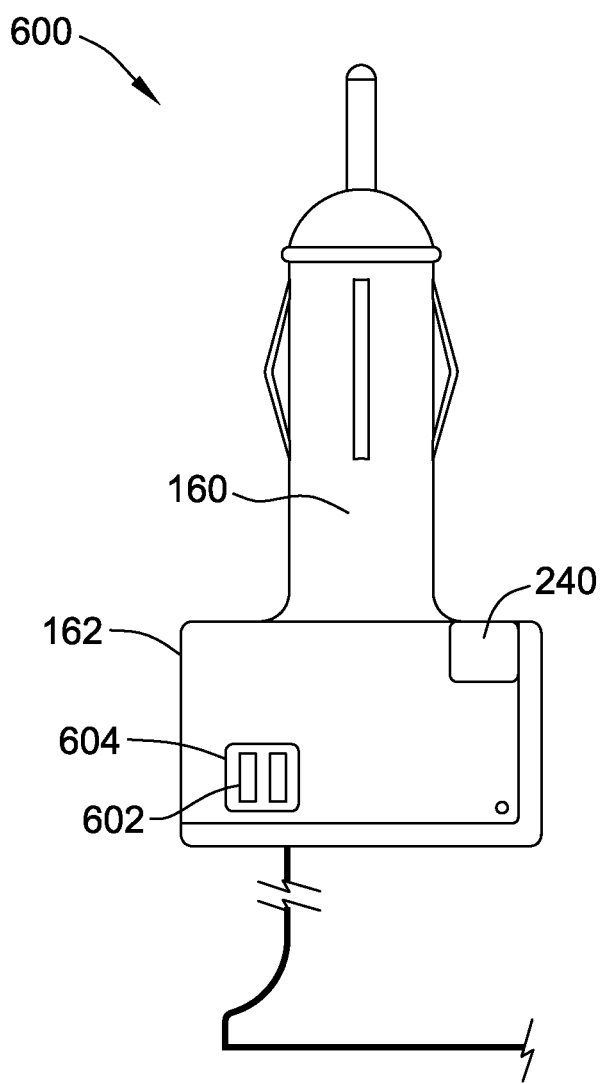
FIG. 13 is a side view of a third alternative embodiment of the emergency communication apparatus shown in FIG. 3.

FIG. 13 is a side view of a third alternative embodiment 600 of the emergency communication apparatus 158 shown in FIG. 3. It will be understood by those skilled in the art that apparatus 158, apparatus 600, and all other alternative embodiments described herein are configured to be "removably coupled" to a vehicle. That is, apparatus 158, apparatus 600, and all other alternative embodiments described herein may be easily coupled to vehicle, such as by coupling to receptacle 172, and easily decoupled, without the use of screws, nails, or other such fasteners. Components in apparatus 600, identical to components of apparatus 158, are identified in FIG. 13 using the same reference numerals as used in FIG. 3.

In the exemplary embodiment, emergency communication apparatus 600 includes one or more batteries 602 positioned within handle 162. Handle 162 includes a door 604 that facilitates access to and/or changing of batteries 602. Batteries 602 may be rechargeable and/or replaceable. When a vehicle is involved in a crash or a high-impact event, the vehicle battery may be destroyed and/or wire malfunctions may occur, resulting in discontinued electricity to the components of the vehicle. In the exemplary embodiment, batteries 602 are configured to provide power to wireless communication device 240 (shown in FIG. 2) in the event that power to emergency communication apparatus 600 is interrupted during an impact or airbag deployment. Additionally, if cellular phone 106 is not plugged-in to emergency communication apparatus 600 at the time of airbag deployment, but is plugged-in to the vehicle accessory receptacle/auxiliary plug-in system, emergency communication apparatus 600 may still transmit airbag deployment signal 120 from wireless communication device 240 in handle 162 to cellular phone wireless communication device 150 by using power from batteries 602. Alternatively, emergency communication apparatus 600 may be powered solely using power from batteries 602. Apparatus 600 may also provide charging power to cellular device 106 through a USB port in addition to, or instead of, the traditional power cord on a cellular device car charger when plugged into receptacle 172 of the vehicle.

Figure 14:
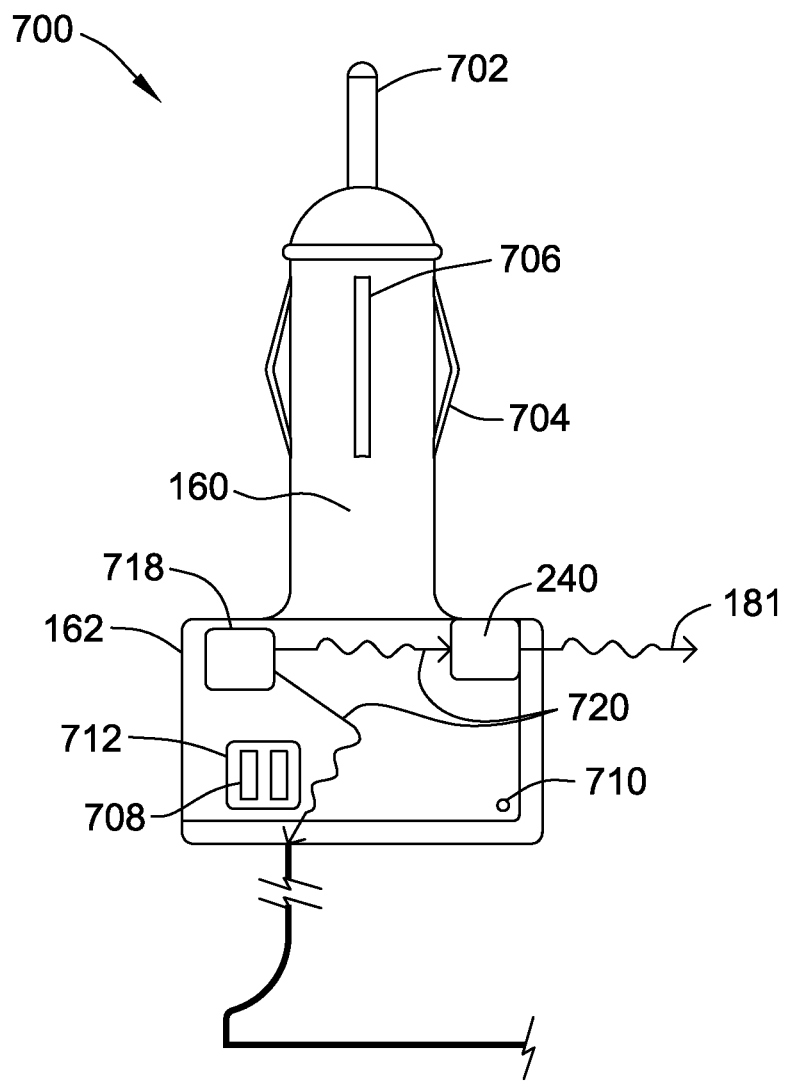
FIG. 14 is a side view of an alternative embodiment of the emergency communication apparatus shown in FIG. 3.

FIG. 14 is a side view of an alternative embodiment 700 of the emergency communication apparatus 158 shown in FIG. 3. Components in system 700, identical to components of apparatus 158, are identified in FIG. 14 using the same reference numerals as used in FIG. 3. In the exemplary embodiment, emergency communication apparatus 600 includes body 160 and handle 162. Body 160 includes a positive ground post 702, a negative ground post 704, and at least one trigger switch 706. Handle 162 includes at least one impact sensor 718, wireless communication device 240, one or more batteries 708, and a status light 710.

In the exemplary embodiment, sensor 718 detects one or more conditions that exceed a predetermined threshold, indicating that the vehicle is involved in a situation that would warrant contacting a provider of emergency services, for example, a vehicle impact, collision, or other type of accident that causes a rapid deceleration of the vehicle. Sensor 718 may include an accelerometer configured to measure a deceleration of the vehicle and/or an orientation of the vehicle. If the deceleration indicates a rapid deceleration, sensor 718 generates an emergency indication signal 720. Sensor 718 may also measure changes in environmental conditions, for example, but not limited to changes in air pressure and changes in humidity level. Such environmental conditions may provide an indication that the vehicle is involved in an emergency situation. Because emergency communication apparatus 700 includes sensor 718, it may operate either cooperatively with or independently from emergency signal assembly 104 without having to communicate with assembly 104. When emergency communication apparatus 700 receives emergency indication signal 720 from sensor 718, impact indication signal 720 is transmitted to cellular phone 106 via wireless communication device 150 using wireless communication device 240 and/or through cellular phone conductor 176 and plug 178 that may be plugged directly into cellular phone 106.

In the exemplary embodiment, emergency communication apparatus 700 is coupled to the vehicle through receptacle 172 (shown in FIG. 2). In the exemplary embodiment, receptacle 172 is a vehicle accessory power source which may be also used as, or commonly referred to as a cigarette lighter receptacle. Alternatively, receptacle 172 may also include any other type of plug-in or port included within a vehicle, including an auxiliary port, a universal serial bus (USB) port, or a vehicle diagnostic system port (also referred to as an "onboard diagnostic" (OBD) port).

In the exemplary embodiment, wireless communication device 240 is configured to receive emergency indication signal from sensors 718, and transmit an impact indication signal 720. Because apparatus 700 may operate either cooperatively with or independently from airbag deployment system 102, an impact indication signal 720 is generated rather than an airbag deployment signal 120. Wireless communication device 240 may include, but is not limited to, a radio frequency identification (RFID) device, a Bluetooth® compatible device, a near-field communication device, or any other suitable wireless communication device that enables apparatus 700 to function as described herein. In the exemplary embodiment, wireless communication device 240 is configured to communicate with wireless communication device 150 of cellular phone 106. Alternatively, wireless communication device 240 may communicate with a cellular network and/or an emergency service.

Emergency communication apparatus 700 includes at least one trigger switch 706, for example, a tab extending radially outward from a surface of emergency communication apparatus 700, or raised from the surface of emergency communication apparatus 700. Trigger switch 706, in combination with positive charge post 702, act as a power switch for sensors 718 and facilitate preventing emergency communication apparatus 700 from producing emergency indication signal 720 when not plugged-in to the vehicle. That is, trigger switch 706 and positive charge post 702 must all be activated to produce emergency indication signal 720.

Emergency communication apparatus 700 transmits a status signal 181 to cellular phone wireless communication device 150 representing a status of apparatus 700. Status signal 181 causes an icon (e.g., an airbag icon on a cellular display screen 148) or other status notification to be displayed using transceiver 144 or wireless communication device 150 of cellular phone 106 to receive status signal 181 when system 100 is in an operational state. Additionally, when apparatus 700 is powered on and in operation, status light 710 is illuminated to notify a user of the status of apparatus 700. In one embodiment, status light 710 is a button configured to be depressed to cancel a false emergency indication signal 720. In such an embodiment, the button is configured to flash for a predetermined amount of time (e.g., 3-5 seconds) before sending emergency indication signal 720 to wireless communication device 240 and/or cellular phone 106.

In one embodiment, emergency communication apparatus 700 includes one or more batteries 708. Batteries 708 are positioned within handle 162 of emergency communication apparatus 700. Handle 162 includes a door 712 that facilitates access to and/or changing of batteries 708. Batteries 708 may be rechargeable and/or replaceable. Apparatus 700 may operate using power solely from batteries 708, or batteries 708 may function as a backup power source in case power from a main power source is interrupted in a vehicle collision.

Figure 15:
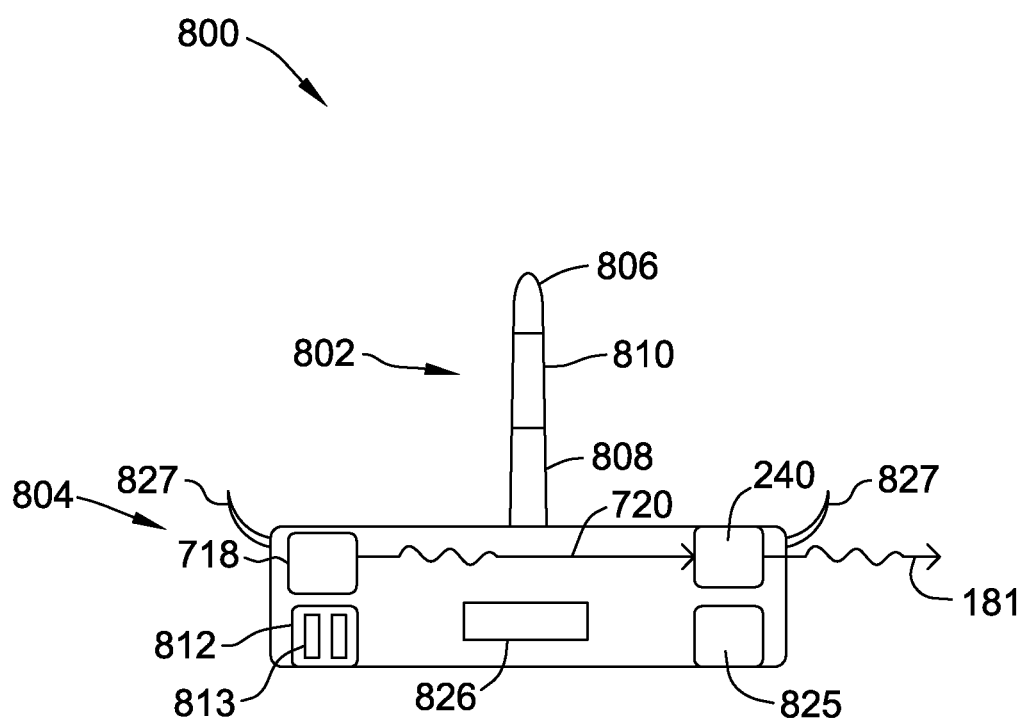
FIG. 15 is a side view of an alternative embodiment of the emergency communication apparatus shown in FIG. 3.

FIG. 15 is a side view of an alternative embodiment 800 of the emergency communication apparatus 158 shown in FIG. 3. In the exemplary embodiment, apparatus 800 is configured to plug-in to an auxiliary jack of a vehicle. The auxiliary jack may be configured to provide power to apparatus 800 or apparatus may operate using batteries. In the exemplary embodiment, apparatus 800 includes a post 802 and a body 804. Post 802 includes a positive charge portion 806, a negative charge portion 808, and an airbag deployment signal portion 810. In the exemplary embodiment, body 804 may include at least one, wireless communication device 240, battery door 812, batteries 813, a GPS device 825, a memory chip device 826, and at least one security clip 827 for securing apparatus 800 to the vehicle. The auxiliary jack may be located in an inconspicuous location within the vehicle, such as, for example, in the glove box, under the dashboard, or in the arm rest console. In some embodiments, the receptacle 172 may be located under an engine hood of the vehicle.

In the exemplary embodiment, airbag deployment signal portion 810 of post 802 of apparatus 800 receives signal 120 through signal converting device or directly from centralized control device 502 that an airbag signal has been sent to airbags 110 in the vehicle. After receiving signal 120, airbag deployment signal portion 810 transmits signal 120 to cellular phone 106 via wireless communication device 150 using wireless communication device 240 of apparatus 800. Because emergency communication apparatus 800 includes airbag deployment signal portion 810, apparatus 800 may operate independently from emergency signal assembly 104 without having to communicate through assembly 104. Alternatively, apparatus 800 may operate cooperatively with emergency signal assembly 104. Once cellular phone 106 receives signal 120, cellular phone 106 can activate the preprogrammed emergency function of cellular phone 106.

In the exemplary embodiment, wireless communication device 240 is configured to receive airbag signal 120 from airbag deployment signal portion 810. Apparatus 800 may operate either cooperatively with or independently from emergency signal assembly 104. Wireless communication device 240 may include, but is not limited to, a radio frequency identification (RFID) device, a Bluetooth® compatible device, a near-field communication device, or any other suitable wireless communication device that enables apparatus 800 to function as described herein. In the exemplary embodiment, wireless communication device 240 is configured to communicate with wireless communication device 150 of cellular phone 106.

Emergency communication apparatus 800 transmits a status signal 181 to cellular phone wireless communication device 150 representing a status of apparatus 800. Status signal 181 causes an icon (e.g., an airbag icon on cellular display screen 148) or other status notification to be displayed using transceiver 144 or wireless communication device 150 of cellular phone 106 to receive signal 181 when apparatus 800 is in an operational state.

In an alternative embodiment, apparatus 800 may be configured similarly to apparatus 700 shown in FIG. 14. In such an embodiment, airbag deployment signal portion 810 would be removed and one or more impact sensors 718 would be provided in body 804.

Figure 16:
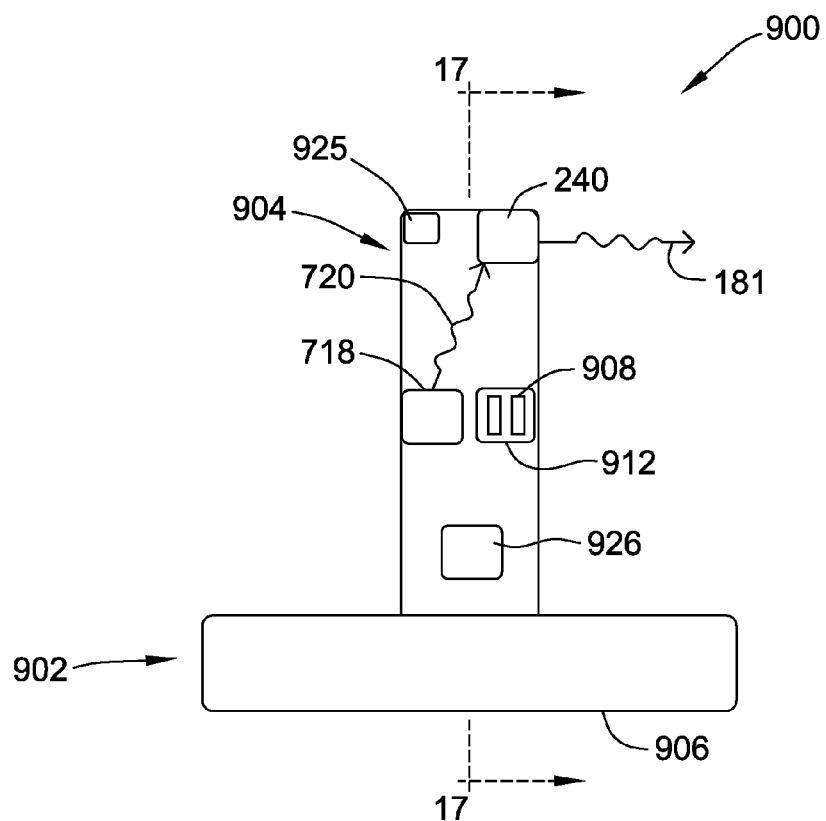
FIG. 16 is a side view of an alternative embodiment of the emergency communication apparatus shown in FIG. 3.
Figure 17:
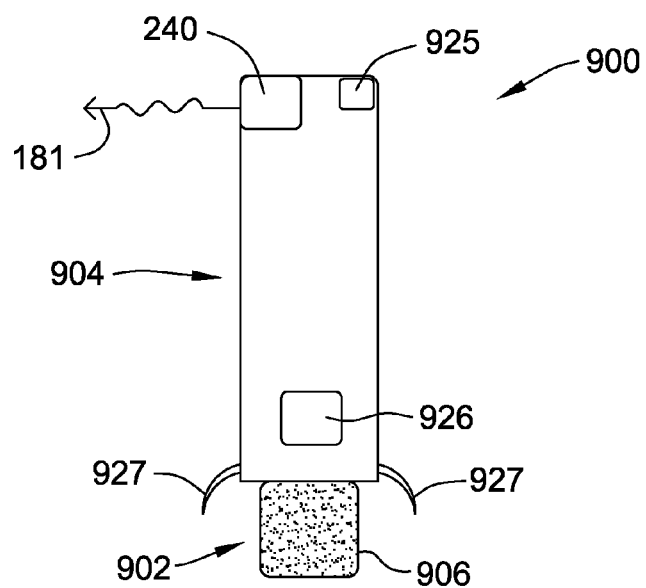
FIG. 17 is a cross-sectional view of the apparatus shown in FIG. 16.

FIG. 16 is a side view of an alternative embodiment 900 of the emergency communication apparatus 158 shown in FIG. 3. FIG. 17 is a cross-sectional view of apparatus 900, taken along line 17-17 of FIG. 16. Components in apparatus 900, identical to components of apparatus 158, are identified in FIG. 16 using the same reference numerals as used in FIG. 3.

In the exemplary embodiment, apparatus 900 includes a plug-in portion 902 and a body 904. Plug-in portion 902 includes an attachment portion 906. Body 904 may include at least one sensor 718, wireless communication device 240, batteries 908, battery door 912, a GPS device 925, and a memory chip device 926. Apparatus 900 is configured to transmit status signal 181 as described herein.

In the exemplary embodiment, attachment portion 906 is configured to be coupled to a receptacle 172 in embodiments wherein receptacle 172 is a vehicle diagnostics port (also referred to as an "on-board diagnostic (OBD) port") of a vehicle. In one embodiment, attachment portion 906 is dual-sided such that while apparatus 900 is plugged-in to receptacle 172, a mechanic may plug a computer device in to attachment portion 906 via plug-in portion 902 to communicate with the vehicle diagnostic system. Generally, the diagnostics port of most vehicles includes power, which may be used to power apparatus 900. Alternatively, batteries 908 may be used to power apparatus 900 or to serve as a backup power source in the event that power to the vehicle is interrupted in a collision.

In one embodiment, receptacle 172, the vehicle diagnostics port, could have a "piggyback", or duplicated port, plug-in to accommodate apparatus 900 so that the vehicle diagnostics port is free and clear for a mechanic to plug-in to for communication with the vehicle diagnostics system. The "piggyback" plug-in could be on the backside, in a discrete location and hidden from sight, of the vehicle diagnostics port area. It could also be located in the vehicle fuse box under the engine hood. Duplication of the vehicle diagnostics port enables easy transmission of information that is already gathered from the vehicle diagnostics port (ex. airbag deployment signal, Inertia Fuel Shutoff (IFS) switch signal, speed, mileage, location, time of day/night, and any other information vehicle manufacturers would provide to the vehicle diagnostics port).

In the exemplary embodiment, apparatus 900 includes sensor 718 to detect an impact event of the vehicle and send emergency indication signal 720 to wireless communication device 240 when an impact occurs, as previously described. Additionally or alternatively, the diagnostics system receives an airbag deployment signal from airbag deployment system 102 and/or a shutoff signal from a fuel shutoff switch (also referred to as Inertia Fuel Shutoff (IFS) switch) of the vehicle. Such signals are transmitted to wireless communication device 240, which then initiates a pre-programmed emergency function, such as, for example, calling emergency services, calling a cellular network, and/or communicating with cellular phone 106 via wireless communication device 150 to enact a pre-programmed number stored in cellular phone 106 and any other program stored in cellular phone 106. Alternatively, wireless communication device 240 may communicate with a cellular network and/or an emergency service independent of cellular phone 106. Device 240 may also be able to text message cellular phone 106 and other communication devices when vehicle is started, when vehicle exceeds a predetermined speed (e.g., 89 MPH), when vehicle is at a predetermined location and/or where vehicle currently is "on demand" by owner through the GPS device contained within apparatus 900. Device 240 may provide any and all information provided to it to a remote device and apparatus 900 could also store any and all information on a memory chip 926 for later review. In effect, device 240 combined with apparatus 900 may form a miniature type limited cell phone.

In one embodiment, apparatus 900 may be configured to record and store, on a memory card or memory chip 926, sounds and/or data provided by the vehicle diagnostics port before, during, and after a collision is detected. Additionally, apparatus 900 may have "clips" or "security straps" 927 to secure apparatus 900, so it is less likely to dislodge during rough travel. Further, apparatus 900 may be configured to provide GPS coordinates to the emergency services or to authorities in case of an accident or if the vehicle is stolen.

In the exemplary embodiment, wireless communication device 240 is configured to receive airbag signal 120 from the vehicle diagnostics port. Apparatus 900 may operate either cooperatively with or independently from emergency signal assembly 104. Wireless communication device 240 may include, but is not limited to, a radio frequency identification (RFID) device, a Bluetooth® compatible device, a near-field communication device, or any other suitable wireless communication device that enables apparatus 900 to function as described herein. In the exemplary embodiment, wireless communication device 240 is configured to communicate with wireless communication device 150 of cellular phone 106.

Emergency communication apparatus 900 transmits a status signal 181 to cellular phone wireless communication device 150 representing a status of apparatus 900. Status signal 181 causes an icon (e.g., an airbag icon on cellular display screen 148) or other status notification to be displayed using transceiver 144 or wireless communication device 150 of cellular phone 106 to receive signal 181 when apparatus 900 is in an operational state.

The methods, apparatus, and systems described herein may be implemented by adding wires and/or devices to an already existing airbag system in a vehicle, by adding wires/or devices to an already existing cell phone car charger accessory, and/or by adding a dedicated slot to a cell phone charging system and/or device so as to recognize a special signal that an airbag has been deployed and the preprogrammed emergency function should be enacted. The methods, apparatus, and systems described herein allow a personal cellular phone to recognize when an airbag is deployed in a vehicle and automatically call 9-1-1 in that circumstance.

In the methods, apparatus, and system described herein, a cell phone vehicle accessory transmits an airbag deployment signal to a cellular phone if airbag deployment occurs. Upon receipt of the airbag deployment signal, at least one preprogrammed emergency function is initiated by the cellular phone.

Described herein are exemplary methods, apparatus, and systems for automatically initiating an emergency function of a cellular phone upon sensing a vehicle has been in an accident. More specifically, the methods, apparatus, and systems described herein provide a cellular phone with an airbag deployment signal and the cellular phone is preprogrammed to perform at least one emergency function upon receipt of the airbag deployment signal. The methods, apparatus, and systems provide this emergency service to customers without a subscription in addition to their personal cellular phone subscription. The methods, apparatus, and systems also provide the emergency service to owners of vehicles manufactured by any manufacturer, including manufacturers that otherwise limit emergency service to service providers associated with preinstalled cellular devices.

The methods, apparatus, and systems described herein facilitate efficient and economical automatic cellular phone emergency notification service. Exemplary embodiments of methods, apparatus, and systems are described and/or illustrated herein in detail. The methods, apparatus, and systems are not limited to the specific embodiments described herein, but rather, components of each apparatus, as well as steps of each method, may be utilized independently and separately from other components and steps described herein. Each component, and each method step, can also be used in combination with other components and/or method steps.

When introducing elements/components/etc. of the methods, apparatus, and systems described and/or illustrated herein, the articles "a," "an," "the," and "said" are intended to mean that there are one or more of the element(s)/component(s)/etc. The terms "comprising," "including," and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device configured to be removably coupled to a vehicle, said device comprising:
    a body configured to couple to a vehicle accessory receptacle, said body includes at least one trigger switch and a positive charge post;
    at least one sensor configured to detect an impact on the vehicle when both of said at least one trigger switch and said positive charge post are activated; and
    a wireless communication device configured to transmit an impact indication signal to a cellular phone upon said at least one sensor detecting an impact on the vehicle.

2. A device in accordance with claim 1, further comprising at least one of a memory chip device, a global positioning system (GPS) device, and a security clip configured to secure the device to the vehicle.

3. A device in accordance with claim 1, wherein said vehicle accessory receptacle provides power to said device.

4. A device in accordance with claim 3, further comprising at least one battery coupled to said body, said battery configured to power said device when power to the vehicle is interrupted.

5. A device in accordance with claim 1, wherein said vehicle accessory receptacle comprises one of a cigarette lighter receptacle, an auxiliary port, a universal serial bus (USB) port, a vehicle diagnostics port, and a duplicated vehicle diagnostics port.

6. A device in accordance with claim 1, wherein said vehicle accessory receptacle is positioned one of under a vehicle dashboard, inside a vehicle glove box, under an engine hood, and inside a vehicle arm rest console.

7. A device in accordance with claim 1, wherein said wireless communication device is configured to transmit the impact indication signal to a cellular network.

8. A device in accordance with claim 1, wherein said wireless communication device is configured to transmit the impact indication signal to the cellular phone to cause the cellular phone to call an emergency service.

9. A device in accordance with claim 1, wherein said at least one sensor transmits an emergency indication signal to said wireless communication device upon detection of an impact greater than a predetermined threshold.

10. A method for automatically initiating a cellular phone emergency function in response to an impact on a vehicle, said method comprising:
    coupling a device to the vehicle, the device being configured to be removably coupled to the vehicle, the device including a body configured to couple to a vehicle accessory receptacle, the body including at least one trigger switch and a positive charge post, the device additionally including at least one sensor configured to detect an impact on the vehicle when both of the at least one trigger switch and the positive charge post are activated and a wireless communication device communicatively coupled to a cellular phone;
    receiving, from the at least one sensor, an emergency indication signal at the wireless communication device, upon the at least one sensor detecting an impact on the vehicle;
    transmitting an impact indication signal from the wireless communication device to the cellular phone; and
    initiating at least one preprogrammed cellular phone emergency function in response to the impact indication signal.

11. A method in accordance with claim 10, further comprising monitoring vehicle operation and generating the emergency indication signal upon a measured indication of at least one of a predefined impact to the vehicle and an environmental change to the vehicle.

12. A method in accordance with claim 10, wherein initiating at least one preprogrammed cellular phone emergency function comprises at least one of initiating a cellular phone call to an emergency service provider by accessing a stored phone number associated with the emergency service provider, initiating a cellular phone call to an emergency contact by accessing a stored phone number associated with the emergency contact, and recording at least one of audio, video, and still images using at least one of the cellular phone and the device.

13. A method in accordance with claim 12, further comprising providing a location of the cellular phone to at least one of the emergency service provider and the emergency contact.

14. A method in accordance with claim 10, wherein the device further includes a status light and the cellular phone further includes a screen, said method further comprising:
    illuminating the status light when the device is powered on and in operation; and
    displaying a status of the device through the screen of the cellular phone.

15. An emergency notification system for a vehicle, said system comprising:
    a device configured to be removably coupled to the vehicle, said device comprising:
        a body configured to couple to a vehicle accessory receptacle, said body includes at least one trigger switch and a positive charge post;
        at least one sensor configured to detect an impact on the vehicle when both of said at least one trigger switch and said positive charge post are activated; and
        a wireless communication device configured to transmit an impact indication signal upon said at least one sensor detecting an impact on the vehicle; and
    a cellular phone configured to initiate at least one preprogrammed cellular phone emergency function in response to said impact indication signal received from said wireless communication device.

16. A system in accordance with claim 15, wherein said at least one sensor is further configured to:
    generate an emergency indication signal upon a measured indication of at least one of a predefined impact to the vehicle and an environmental change to the vehicle; and
    transmit the emergency indication signal to the wireless communication device.

17. A system in accordance with claim 15, wherein said vehicle accessory receptacle comprises one of a cigarette lighter receptacle, an auxiliary port, a universal serial bus (USB) port, a vehicle diagnostics port, and a duplicated vehicle diagnostics port;
    at least one sensor configured to detect an impact on the vehicle when both of said at least one trigger switch and said positive charge post are activated; and
    a wireless communication device configured to transmit an impact indication signal to a cellular phone upon said at least one sensor detecting an impact on the vehicle.

* * * * *